(12) United States Patent
Tanaka (10) Patent No.: US 7,701,598 B2
(45) Date of Patent: Apr. 20, 2010

(54) IMAGE FORMING DEVICE AND STORAGE MEDIUM STORING CONTROL PROGRAM FOR IMAGE FORMING DEVICE

(75) Inventor: Kunihiko Tanaka, Osaka (JP)

(73) Assignee: Kyocera Mita Corporation (JP)

( * ) Notice: Subject to any disclaimer, the term of this patent is extended or adjusted under 35 U.S.C. 154(b) by 1148 days.

(21) Appl. No.: 11/306,393

(22) Filed: Dec. 27, 2005

(65) Prior Publication Data
US 2006/0197995 A1 Sep. 7, 2006

(30) Foreign Application Priority Data

Dec. 28, 2004 (JP) ............... 2004-380426
Dec. 28, 2004 (JP) ............... 2004-380427

(51) Int. Cl.
*H04N 1/00* (2006.01)
(52) U.S. Cl. ............ 358/1.14; 358/453; 358/3.28; 380/201; 380/203; 713/176; 713/183; 382/181; 382/190
(58) Field of Classification Search .......... 358/1.1, 358/1.18, 453, 403, 3.28, 1.15, 1.14, 1.13; 380/243, 201, 203, 210, 30; 386/46, 95; 713/202, 176, 183, 184; 382/100, 138, 137, 382/135, 181, 190, 198
See application file for complete search history.

(56) References Cited

U.S. PATENT DOCUMENTS

| | | | | |
|---|---|---|---|---|
| 5,115,508 A | * | 5/1992 | Hatta | .................. 340/5.22 |
| 5,537,401 A | * | 7/1996 | Tadamura et al. | ........... 370/409 |
| 5,610,688 A | * | 3/1997 | Inamoto et al. | ............. 399/366 |
| 6,523,113 B1 | * | 2/2003 | Wehrenberg | ................ 713/176 |
| 6,601,174 B1 | * | 7/2003 | Cromer et al. | ................ 726/10 |
| 6,611,820 B2 | * | 8/2003 | Oshima et al. | ............... 705/56 |
| 6,728,379 B1 | * | 4/2004 | Ishibashi et al. | ............ 380/278 |
| 6,728,466 B1 | * | 4/2004 | Tanaka | ...................... 386/46 |
| 7,499,187 B2 | * | 3/2009 | Kouno | ..................... 358/1.13 |
| 2001/0010081 A1 | * | 7/2001 | Nagahama | ................ 713/202 |
| 2009/0262390 A1 | * | 10/2009 | Tanaka | ..................... 358/1.15 |

FOREIGN PATENT DOCUMENTS

| | | |
|---|---|---|
| JP | 2001-209614 A | 8/2001 |
| JP | 2003/50525 A | 2/2003 |
| JP | 2004-171071 A | 6/2004 |

* cited by examiner

*Primary Examiner*—Benny Q Tieu
*Assistant Examiner*—Ashish K Thomas
(74) *Attorney, Agent, or Firm*—Ostrolenk Faber LLP (57) ABSTRACT

In an image forming device, output is prohibited by an output control unit if specific image data is detected in image data obtained by reading an original document. The current data is acquired when the output control unit prohibits output, and the password is created in accordance with the current data. The image data which is prohibited from being output by the output control unit is transmitted to an administrator, and then if output permission is obtained by the administrator, output permitted data is generated as an image in which a password created by the password creating unit is embedded in such a manner that a user can not identify the password, and is output by the output unit. The output permitted image outputted by the output unit is read by the reading unit, and then the embedded password data is extracted by the extraction unit. If it is determined that the password extracted by the extraction unit and the password created by the password creating unit correspond to each other, the prohibition on the output will be lifted.

4 Claims, 9 Drawing Sheets

IMAGE FORMING DEVICE AND STORAGE MEDIUM STORING CONTROL PROGRAM FOR IMAGE FORMING DEVICE

BACKGROUND OF THE INVENTION

1. Field of the Invention

The present invention relates to an image forming device, particularly to an image forming device equipped with an anti-counterfeit function. Furthermore, the present invention relates to a storage medium for storing a control program for this image forming device.

2. Background Data

Recently, due to dramatic improvements in color copiers, MFPs (Multi Function Products), color scanners, and color printers, the quality of the copied images produced thereby has reached such a high level that it is difficult to distinguish a copy image from the original image. Therefore, anyone can copy an original image while maintaining a high degree of fidelity to the original.

On the other hand, risks associated with the increasing use of devices for counterfeiting copy-prohibited articles, such as paper money and securities, have increased. Therefore, various anti-counterfeit technologies have been developed to prevent these risks from occurring.

In one of the technologies, it is determined whether or not a specific image contained in paper money or a security is detected in the image obtained by reading the original image, and if the specific image is contained therein, output is prohibited.

However, the position and slope of the original when placed on the platen will not be constant, and the original itself may include variations such as wrinkles and the like. If one tries to reliably detect a specific image under various conditions, images similar to the specific image might be detected erroneously.

In order to solve this problem, an image forming system has been proposed in which, even if an anti-counterfeit process is accidentally performed, it is possible to cancel the anti-counterfeit process so as to execute authorized copying whose purpose is not to counterfeit paper money or the like. Specifically, the system is configured as follows.

If the anti-counterfeit process in the copying machine is accidentally performed to prohibit copy output, a client using the copying machine notifies a control center of the prohibition.

After the notification, the control center will provide the client with a password that is administered by a client management database in the control center, the password corresponding to each of the clients using the copying machine.

The client using the copying machine will input the password into the copying machine, so that the anti-counterfeit process will be canceled and copying can be performed (See Unexamined Patent Application Publication 2003-50525).

However, with the above-described conventional technology, since the password is disclosed to the client in order to cancel the anti-counterfeit process, there is a risk that the password will be leaked to outsiders.

Moreover, even if the period of time in which the disclosed password can be used is limited, if the password is leaked after use, an outsider can subsequently use that password in an unauthorized manner during the remaining period of use.

Furthermore, in the above-described technology, there are other risk of password leakage, such as unauthorized access to the client management database by an outsider, or an outsider learning the password by surreptitiously observing a client inputting the same.

Therefore, an object of the present invention is to provide an image forming device which can improve the security of the password used to cancel an anti-counterfeit process.

SUMMARY OF THE INVENTION

The present invention assumes an image forming device in which output is prohibited by an output control unit if specific image data is detected in image data obtained by reading an original document.

According to a first aspect of the present invention, an image forming device includes an output control unit which prohibits output by the image forming device if specific image data is detected in image data of an original document; a current data acquisition unit which acquires current data corresponding to a time at which output is prohibited by the output control unit; a password creating unit which creates a password in accordance with the current data acquired by the current data acquisition unit; a transmit/receive unit which transmits image data which is prohibited from being output by the output control unit and receives output permission/prohibition data; an identification unit which identifies the output permission/prohibition data received by the transmit/receive unit; an output permitted image generating unit which generates an output permitted image in which the password created by the password creating unit is embedded such that it is impossible for a user to identify the password, the output permitted image generating unit generating the output permitted image if the output permission data is identified by the identification unit; an output unit which outputs the output permitted image generated by the output permitted image generating unit; a reading unit which reads the output permitted image output by the output unit; an extraction unit which extracts password data embedded in the output permitted image data which is read by the reading unit; and a determination unit which determines whether or not the password extracted by the extraction unit and the password created by the password creating unit correspond to each other. The output control unit will lift a prohibition on output if the determination unit determines that the passwords correspond to each other.

It is preferable that the output permitted image generating unit generates the output permitted image such that the password created by the password creating unit will be embedded therein by means of a digital watermark, a two-dimensional code, or a bar code.

It is preferable that the current data includes at least one selected from the group consisting of a number indicated by an output volume counter, and the time and date.

In this configuration, since the password is used in such a manner that a user can not identify it when lifting a prohibition on output in the anti-counterfeit process, it is possible to reduce the risk of leaking the password to outsiders, and thus increase the security of the password.

In addition, since the password is created in accordance with the current data corresponding to a time when the output is prohibited, the password is not uniquely identified uniquely, so that even if a password that has been used once is leaked, it is possible to prevent the subsequent unauthorized use thereof, and thus further improving the security of the password.

According to a second aspect of the present invention, a storage medium is disclosed which stores a control program that is executable by a computer in an image forming device. The control program causes the computer to execute functions comprising an output control function which prohibits output by the image forming device if specific image data is detected in image data of an original document; a current data acquisition function which acquires current data corresponding to a time at which output is prohibited by the output control function; a password creating function which creates a password in accordance with the current data acquired by the current data acquisition function; a transmit/receive function which transmits image data which is prohibited from being output by the output control function and receives output permission/prohibition data; an identification function which identifies the output permission/prohibition data received by the transmit/receive function; an output permitted image generating function which generates an output permitted image in which the password created by the password creating function is embedded such that it is impossible for a user to identify the password, the output permitted image generating function generating the output permitted image if the output permission data is identified by the identification function; an output function which outputs the output permitted image generated by the output permitted image generating function; a reading function which reads the output permitted image output by the output function; an extraction function which extracts password data embedded in the output permitted image data which is read by the reading function; and a determination function which determines whether or not the password extracted by the extraction function and the password created by the password creating function correspond to each other. The output control function will lift a prohibition on output if the determination function determines that the passwords correspond to each other.

According to a third aspect of the present invention, an image forming device comprises an output control unit which prohibits output by the image forming device if specific image data is detected in image data of an original document; a current data acquisition unit which acquires current data corresponding to a time at which output is prohibited by the output control unit; a password creating unit which creates a password in accordance with the current data acquired by the current data acquisition unit; a password acceptance unit for accepting input of the password; and a determination unit which determines whether or not the password created by the password creating unit and the password accepted by the password acceptance unit correspond to each other. The output control unit will lift a prohibition on output if the determination unit determines that the passwords correspond to each other.

It is preferable that the current data includes at least one selected from the group consisting of a number indicated by an output volume counter, and the time and date.

In the above configuration, since the password is created in accordance with the current data corresponding to the time when output is prohibited, the password is not uniquely identified, and thus even if a password that has been used once is leaked, it will be possible to prevent the subsequent unauthorized use thereof, and thus improve the security of the password.

According to a fourth aspect of the present invention, a storage medium is disclosed which stores a control program that is executable by a computer in an image forming device. The control program causes the computer to execute functions comprising an output control function which prohibits output by the image forming device if specific image data is detected in image data of an original document; a current data acquisition function which acquires current data corresponding to a time at which output is prohibited by the output control function; a password creating function which creates a password in accordance with the current data acquired by the current data acquisition function; a password acceptance function for accepting input of the password; and a determination function which determines whether or not the password created by the password creating function and the password accepted by the password acceptance function correspond to each other. The output control function will lift a prohibition on output if the determination function determines that the passwords correspond to each other.

In this configuration, since the password is used in such a manner that a user can not identify it when lifting a prohibition on output in the anti-counterfeit process, it will be possible to reduce the risk of leaking the password to outsiders, thus increasing the security of the password.

In addition, since the password is created in accordance with the current data corresponding to the time when output is prohibited, the password is not uniquely identified, and thus even if a password that has been used once is leaked, it is possible to prevent the subsequent unauthorized use thereof, and thus further improve the security of the password.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

First Embodiment

Hereinafter, a first embodiment of the present invention will be described in detail with reference to the drawings.

Figure 1:
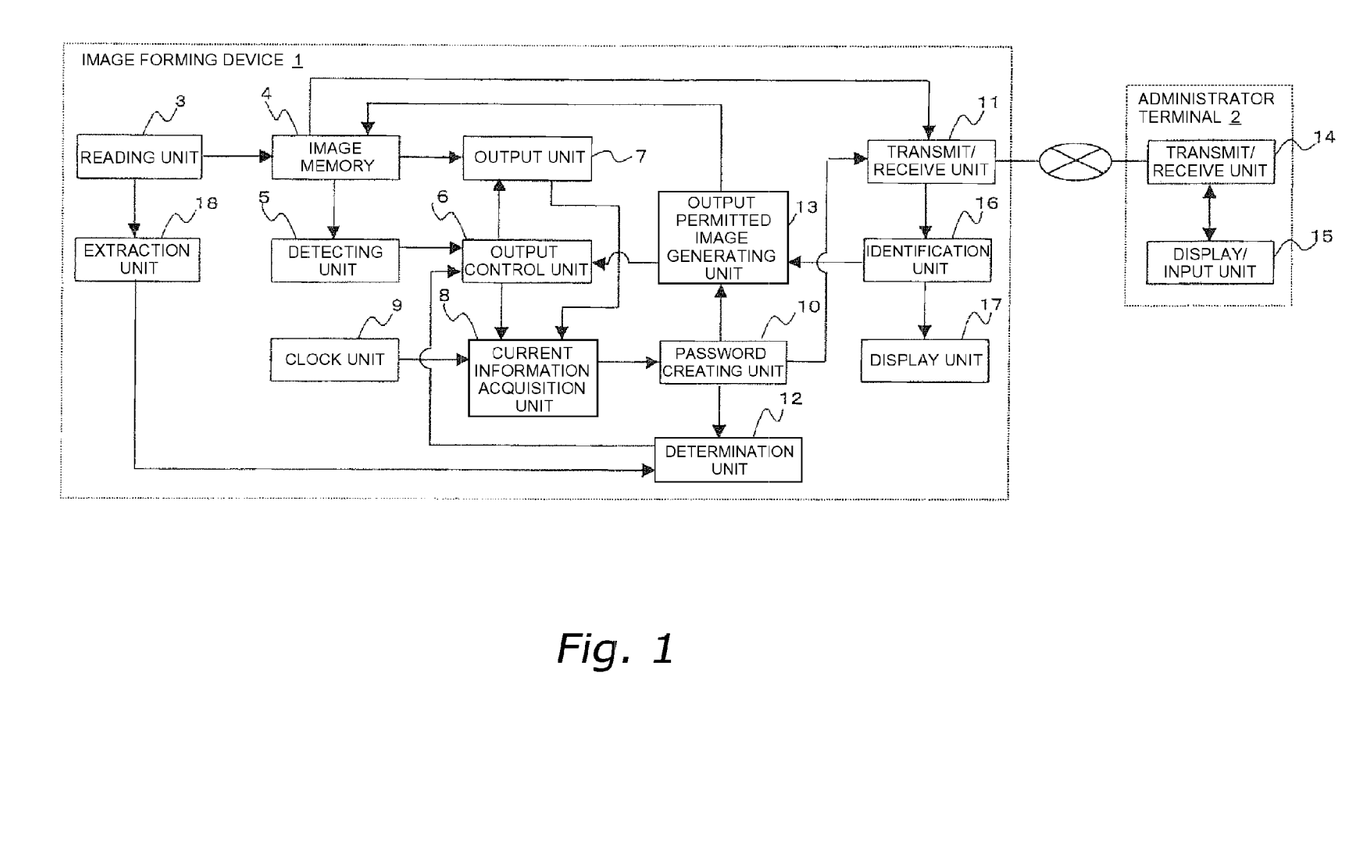
FIG. 1 is a schematic, functional block diagram showing an image forming system constituted by an image forming device according to a first embodiment of the present invention.
Figure 2:
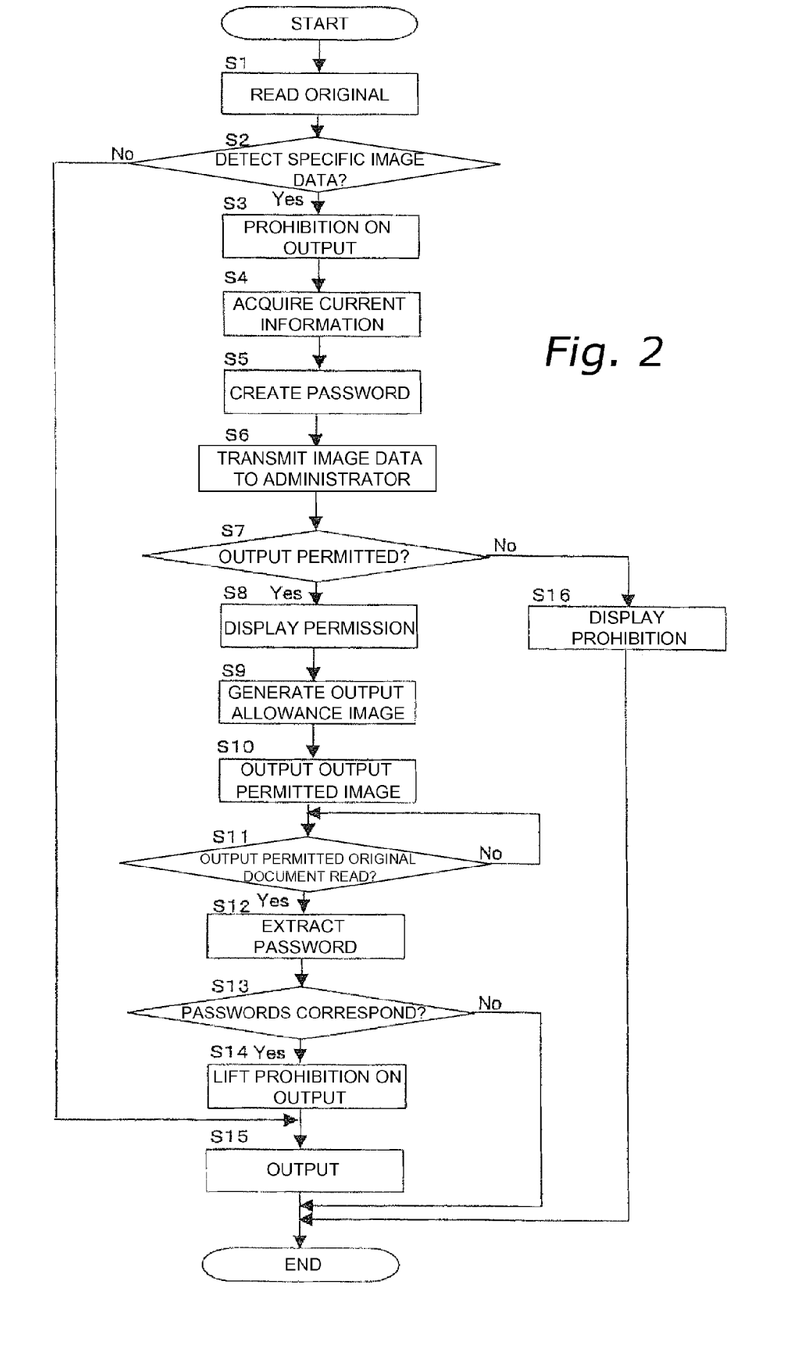
FIG. 2 is a flow chart showing the operation of the image forming device in the first embodiment of the present invention.

FIG. 1 is a schematic, functional block diagram of the image forming system constituted by the image forming device according to the first embodiment of the present invention, and FIG. 2 is a flow chart showing the operation of the image forming device according to the first embodiment.

In FIG. 1, an image forming device 1 according to the first embodiment of the present invention is a color copier connected with an administrator terminal 2 via a network, for example.

In the above-described configuration, if a user sets an original document on a document platen of the image forming device 1 and pushes a read key, a reading unit 3 will read the original (S1).

The image data obtained by the reading unit 3 is stored into an image memory 4, and then a detecting unit 5 refers to the image data in the image memory 4.

The detecting unit 5 holds specific image data concerning characteristic portions of various documents that are not permitted to be copied, such as for example paper money or various securities, and compares the specific image data with the image data of the original document in the image memory 4.

Here, if the specific image data is not detected by the detecting unit 5, notification that the output should be executed will be sent to an output control unit 6 in order to output the image data in the image memory 4.

After receiving notification that the output should be executed, the output control unit 6 will command the output unit 7 to access the storage location of the image data in the image memory 4, so that the output unit 7 will output the image data in the image memory 4 (S2 to S15). Alternatively, output may be executed even if notification that the output should be executed is not sent.

On the other hand, if the specific image data is detected by the detecting unit 5, notification is sent to the output control unit 6 that the output of the image data in the image memory 4 should be prohibited because the specific image data was detected in the image data of the original document.

After receiving notification that output should be prohibited, the output control unit 6 will prohibit the output unit 7 from accessing the storage location of the output-prohibited image data in the image memory 4, in order to prohibit the output unit 7 from outputting the output-prohibited image data in the image memory 4 (S2 to S3).

Moreover, after receiving the notification that output should be prohibited, the output control unit 6 will command a current data acquisition unit 8 to acquire current data. Current data includes the number of pages of prohibited output indicated by an output volume counter built into the output unit 7, and the time and date indicated by a clock unit 9, for example.

After receiving this command, the current data acquisition unit 8 will acquire the current data (S4), and then input the acquired current data into a password creating unit 10.

Figure 3:
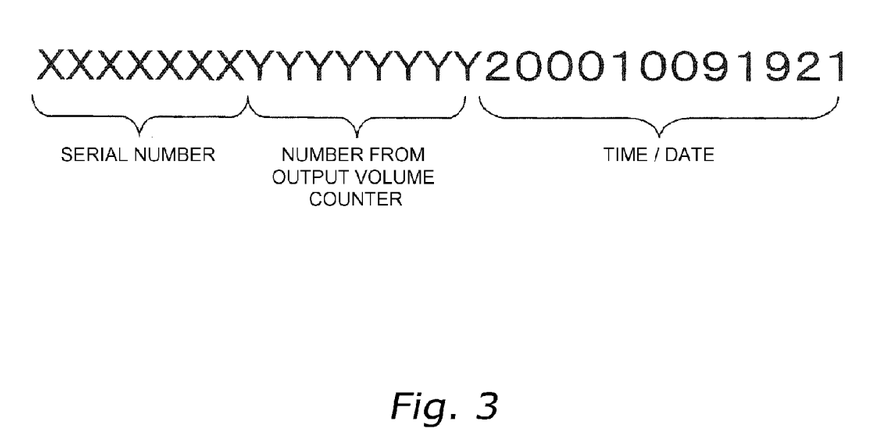
FIG. 3 shows an example of the password.

After obtaining the current data, the password creating unit 10 arranges, for example, as shown in FIG. 3, the numbers of the serial number of the image forming device 1, the number indicated by the output volume counter, and the time and date, in this order, in order to create the password (S5). If the sorted order of the serial number, the number indicated by the output volume counter, and the time and date when creating the password is predetermined, the order is not significant. Furthermore, unique data may be combined with one portion of the current data in order to create the password, such as a combination of the serial number and the number indicated by the output volume counter, and a combination of the serial number and the time and date. In addition, one portion of the current data alone may be used to create the password.

After creating the password, the password creating unit 10 sends notification that the password has been created to a transmit/receive unit 11, and inputs the password data of the created password to a determination unit 12 and an output permitted image generating unit 13 (described below) in order to store the same therein.

After receiving notification that the password has been created, the transmit/receive unit 11 accesses the storage location of the output-prohibited image data in the image memory 4, reads out the output-prohibited image data, and sends the image data to the administrator terminal 2 (S6).

After receiving the output-prohibited image data via a transmit/receive unit 14 of the administrator terminal 2, an administrator, for example, will visually confirm the image displayed on a display/input unit 15 in the administrator terminal 2.

If the administrator performs visual confirmation, and then inputs output permission/prohibition data regarding whether or not output should be permitted into the display/input unit 15, the transmit/receive unit 14 will transmit the output permission/prohibition data to the image forming device 1, and the transmit/receive unit 11 will receive the permission/prohibition data and input the permission/prohibition data into an identification unit 16.

Here, the identification unit 16 holds identification data for distinguishing output permission from output prohibition, and compares the identification data with the permission/prohibition data that is input, in order to identify whether the input data corresponds to output permission or output prohibition data.

Figure 4:
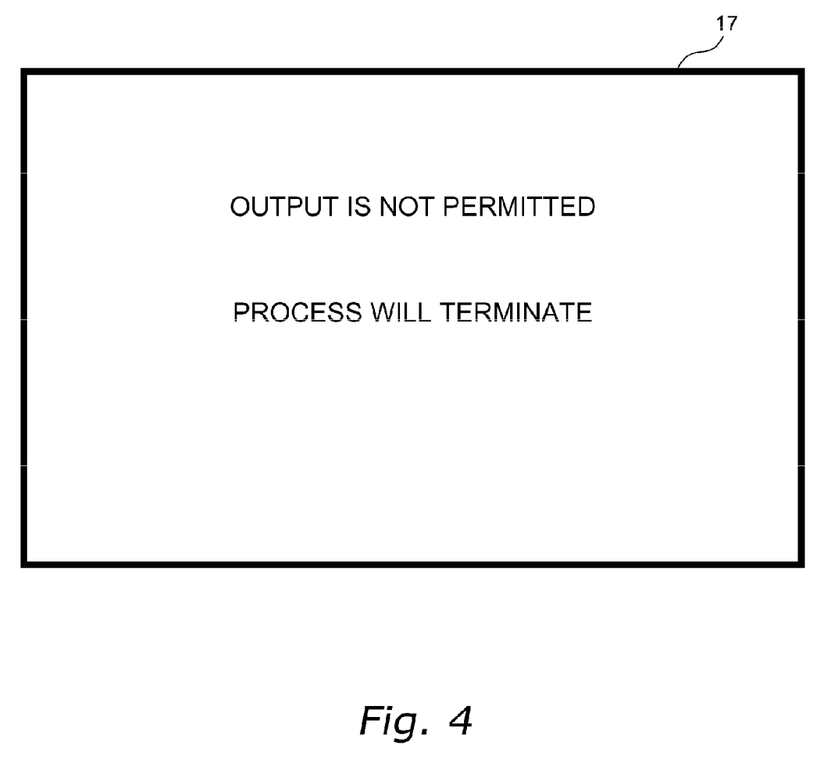
FIG. 4 shows a display screen.

If the identification unit 16 determines that the input data corresponds to output prohibition, the identification unit 16 displays a message that output is not allowed on a display unit 17, as shown in FIG. 4, and then the process is terminated (S7 to S16).

Figure 5:
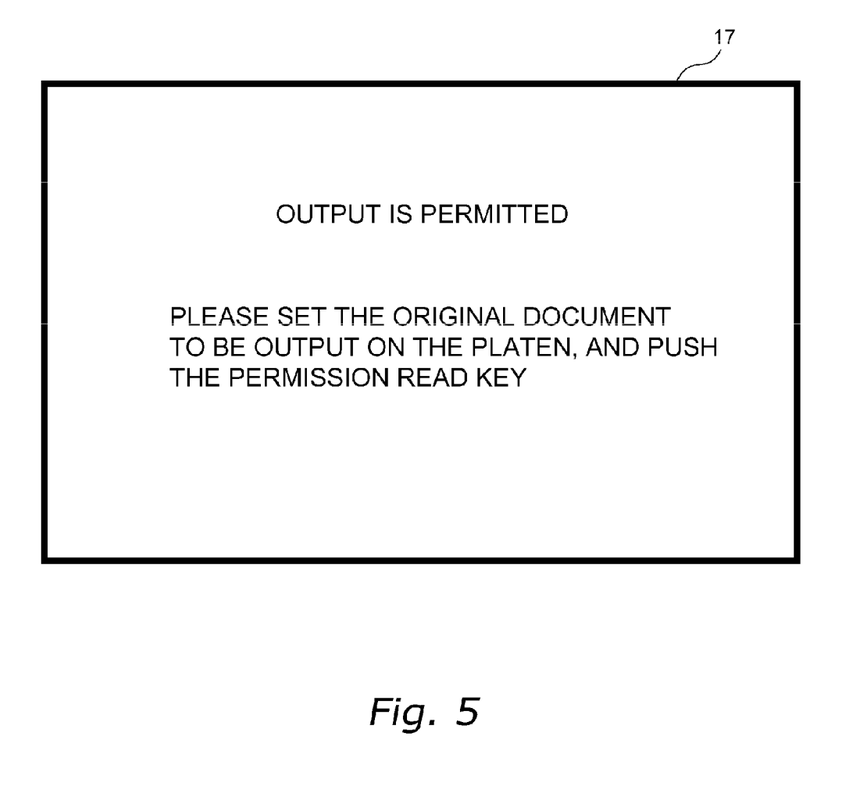
FIG. 5 shows a display screen.

On the other hand, if the identification unit 16 recognizes that the input data corresponds to output permission, the identification unit 16 displays a notification that output is allowed, and a guidance message showing subsequent procedures, on the display unit 17 as shown in FIG. 5 (S7 to S8), and commands the output permitted image generating unit 13 to generate an output permitted image 20 that will lift the prohibition on output in the anti-counterfeit process.

After receiving the instruction to generate the output permitted image 20, the output permitted image generating unit 13 generates the output permitted image 20 by embedding, by means of a digital watermark, the password data of the password created by the password creating unit 10 into the image data of the guidance message previously stored in the unit 13 (S9).

Figure 6:
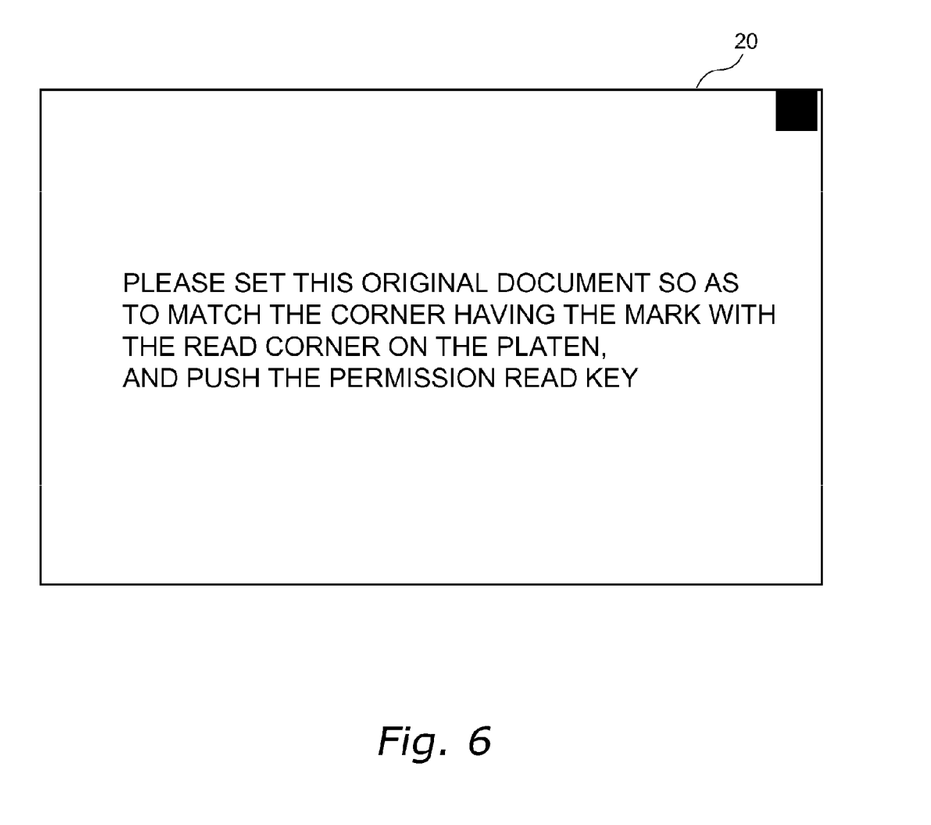
FIG. 6 shows an example of the allowed output image.

The output permitted image 20 is, for example, an image of the guidance message in which the password is embedded by means of a digital watermark which people can not perceive, as shown in FIG. 6, and thus the user can not recognize the password.

If the generation of the output permitted image 20 is finished, the output permitted image generating unit 13 stores the image data for the output permitted image 20 into the image memory 4, sends the storage location of the image data for the output permitted image 20 in the image memory 4, and notification that the generation of the output permitted image 20 is finished, to the output control unit 6.

After receiving notification that the generation of the output permitted image 20 is finished, the output control unit 6 commands the output unit 7 to access the storage location of the image data of the output permitted image 20 in the image memory 4, so that the output unit 7 will output the image data of the output permitted image 20 in the image memory 4 (S10).

If a user who is in possession of an output permitted original document, as described above, sets the output permitted original document on the document platen according to the guidance message and presses a permission read key, the reading unit 3 will read a password which is embedded as a digital watermark in the output permitted original document (S11).

After reading the output permitted original document, the reading unit 3 inputs the output permitted image data into an extraction unit 18, and the extraction unit 18 extracts the password data embedded in the output permitted image data (S12).

After extracting the password data, the extraction unit 18 inputs the extracted password data into the determination unit 12.

At this time, the determination unit 12 decides whether or not the password created in the password creating unit 10 and the password extracted by the extraction unit 18 correspond to each other (S13).

If it is determined that the passwords do not correspond to each other in the determination process S13, e.g., when an original document is read that is different from the output permitted original document, the process will terminate.

On the other hand, if it is determined that the passwords correspond to each other in the determination process S13, the determination unit 12 notifies the output control unit 6 that the prohibition on the output should be lifted.

After receiving notification that the prohibition on the output should be lifted, the output control unit 6 will permit the output unit 7 to access the storage location of the output-prohibited image data in the image memory 4, and thus the output unit 7 will lift the prohibition on the output of the output-prohibited image data in the image memory 4 (S14).

As mentioned above, after the prohibition on the output is lifted, the output unit 7 will access the storage location of the image data in the image memory 4 from which the prohibition on the output is lifted, and will output the image data in the image memory 4 from which the prohibition on output was lifted (S15).

In the process mentioned above, since the password is unrecognizable to the user when lifting the prohibition on output in the anti-counterfeit process, it is possible to reduce the risk of leaking the password to outsiders, thus improving the security of the password.

In addition, since the password is created in accordance with current data corresponding to the time when output is prohibited, the password will not be uniquely identified, and thus even if the password that has been used once is leaked, it is possible to prevent the subsequent unauthorized use of that password, thus further improving the security of the password.

Although in the above-mentioned embodiment, the output permitted image generating unit 13 embeds the password by means of a digital watermark, the password may be embedded by means of a two-dimensional code or a bar code.

It will be easily understood that in addition to the mode described in the above-mentioned embodiment wherein the user instructs the device to read the output permitted original document in order to lift a prohibition on output in the anti-counterfeit process, it is also possible to employ another mode in which a serviceman will manually input the password on the spot in order to lift a prohibition on output in the anti-counterfeit process, and thereby allowing a user to select which mode should be established.

In this situation, it is preferable that the serviceman comes to the image forming device 1 to obtain the current data, arranges the current data to obtain a password referring to a predetermined sorted order similar to the order sorted by the password creating unit 10, and then inputs the password.

Second Embodiment

Hereinafter, a second embodiment of the present invention will be described in detail with reference to the drawings.

Figure 7:
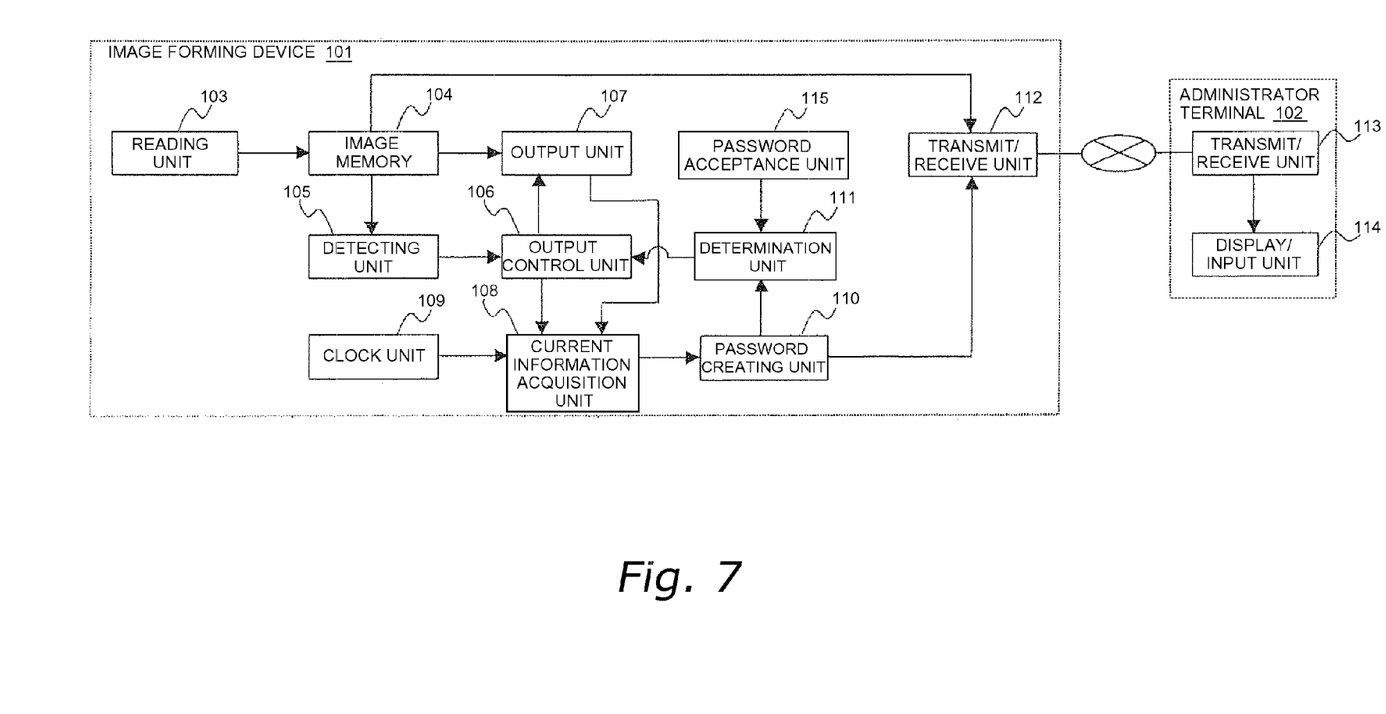
FIG. 7 is a schematic, functional block diagram showing an image forming system constituted by an image forming device according to a second embodiment of the present invention.
Figure 8:
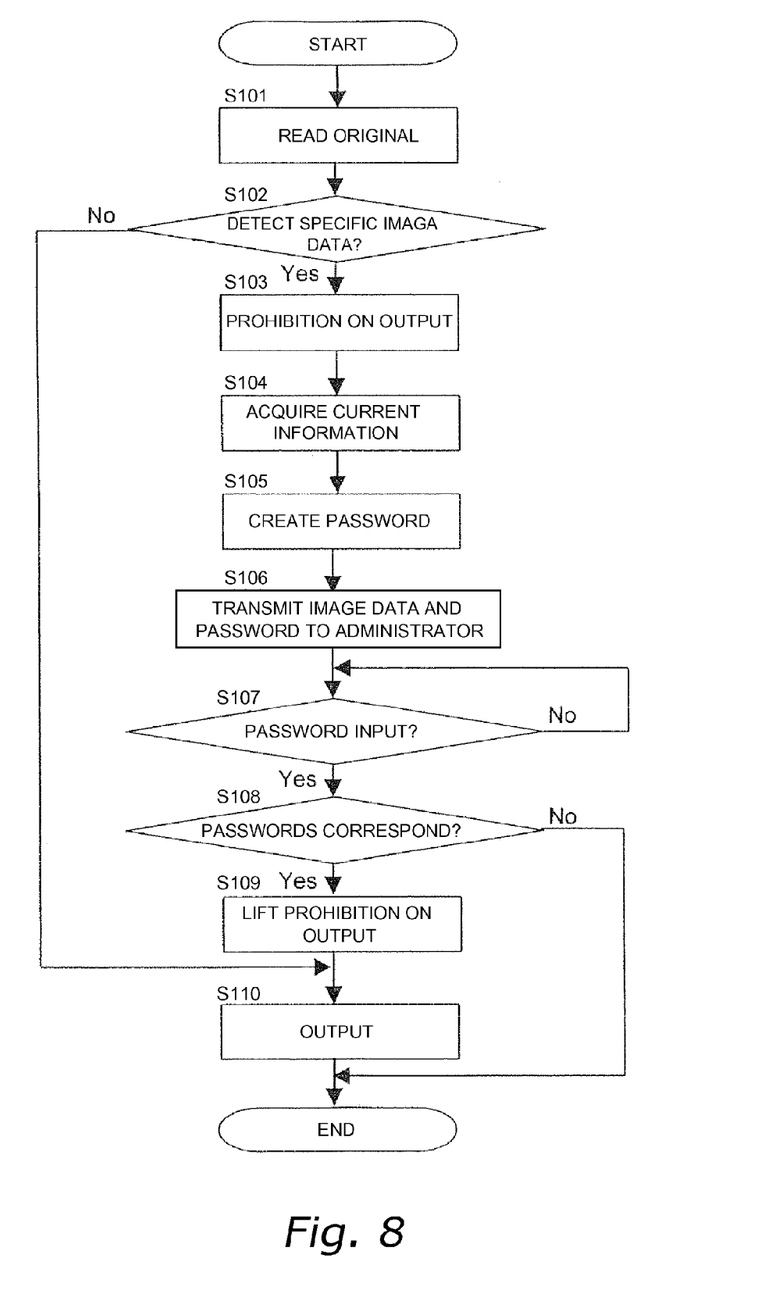
FIG. 8 is a flow chart showing the operation of the image forming device in the second embodiment of the present invention.

FIG. 7 is a schematic, functional block diagram of the image forming system constituted by the image forming device according to the second embodiment the of the present invention, and FIG. 8 is a flow chart showing the operation of the image forming device according to the present invention.

In FIG. 7, an image forming device 101 according to the second embodiment of the present invention is a color copier connected with an administrator terminal 102 via a network, for example.

In the above-described configuration, if a user sets an original document on a document platen of the image forming device 101 and pushes a start key, a reading unit 103 will read the original (S101).

The image data obtained by the reading unit 103 is stored into an image memory 104, and then a detecting unit 105 refers to the image data in the image memory 104.

The detecting unit 105 holds specific image data concerning characteristic portions of various documents that are not permitted to be copied, such as for example paper money or various securities, and compares the specific image data with the image data of the original document in the image memory 104.

Here, if the specific image data is not detected by the detecting unit 105, the detecting unit 105 will notify an output control unit 106 that output should be executed.

After receiving notification that the output should be executed, the output control unit 106 will command the output unit 107 to output the image data in the image memory 104 (S102 to S110). Alternatively, the output may be executed even if notification that the output should be executed is not sent.

On the other hand, if the specific image data is detected by the detecting unit 105, notification is sent to the output control unit 106 that the output should be prohibited.

After receiving notification that the output should be prohibited, the output control unit 106 will prohibit the output unit 107 from accessing the image memory 104, in order to prohibit the output unit 107 from outputting the image data stored in the image memory 104 (S102 to S103).

Moreover, after receiving notification that the output should be prohibited, the output control unit 106 will command a current data acquisition unit 108 to acquire current data. Current data includes the number of pages of prohibited output indicated by an output volume counter built in the output unit 107, and time and date indicated by a clock unit 109, for example.

After receiving this command, the current data acquisition unit 108 will acquire the current data (S104), and then input the acquired current data into a password creating unit 110.

Figure 9:
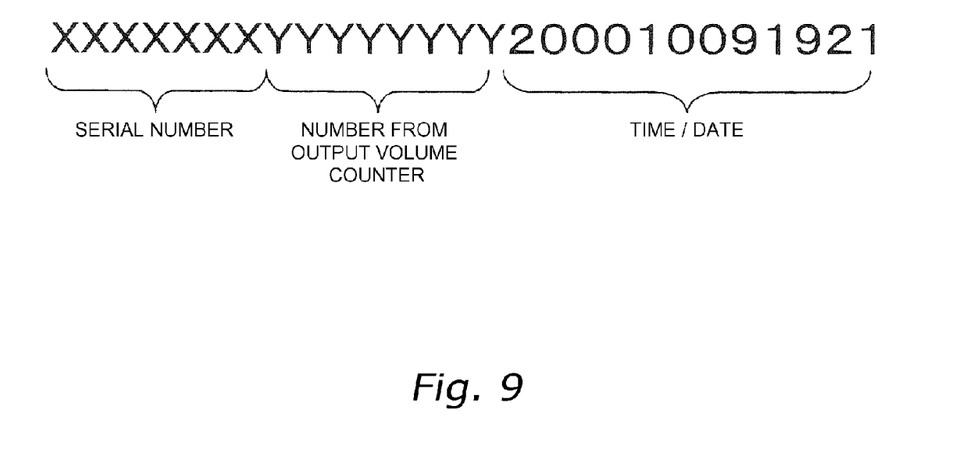
FIG. 9 shows an example of the password.

After obtaining the current data, the password creating unit 110 arranges, for example, as shown in FIG. 9, the numbers of the serial number of the image forming device 101, the number indicated by the output volume counter, and the time and date, in this order, in order to create the password (S105). If the sorted order of the serial number, the number indicated by the output volume counter, and the time and date when creating the password is predetermined, the order is not significant. Furthermore, unique data may be combined with one portion of the current data in order to create the password, such as a combination of the serial number and the number indicated by the output volume counter, and a combination of the serial number and the time and date. In addition, one portion of the current data alone may be used to create the password.

After creating the password, the password creating unit 110 inputs password data of the created password to a determination unit 111, and transmits the password data to a transmit unit 112. The password data of the created password is held by the determination unit 111 until the determination process S108 is executed as described below.

On the other hand, after receiving the password, the transmit unit 112 will access the image memory 104, read out the image data stored in the image memory 104, and send the password as well as the image data to the administrator terminal 102 (S106).

After receiving the image data and the password via a receive unit 113 of the administrator terminal 102, an administrator, for example, will visually confirm the image and the password displayed on the display unit 114 in the administrator terminal 102.

When visually confirming the image, the administrator sees the image displayed on the display unit 114, and if he or she determines that the image is not an unauthorized image, such as an image of paper money or securities, he or she will notify a serviceman of the password.

After receiving the password, the serviceman will come to the image forming device 101, and input the password into a password acceptance unit 115 of the image forming device 101 (S107).

When the password acceptance unit 115 accepts the password, the password acceptance unit 115 inputs the password data of the accepted password into the determination unit 111.

At this time, the determination unit 111 decides whether or not the password created in the password creating unit 110 and the password accepted in the password acceptance unit correspond to each other (S108).

If it is decided that the passwords do not correspond to each other in the determination process S108, the process will terminate. On the other hand, if it is decided that the passwords correspond to each other, the determination unit 111 will notify the output control unit 106 that the prohibition on the output should be lifted. After receiving the notification, the output control unit 106 will lift the prohibition on output from the output unit 107 (S109).

As mentioned before, if the prohibition on output is lifted, the output unit 107 will output the image data stored in the image memory 104 (S110).

In the process mentioned above, since the password is created in accordance with current data corresponding to the time when the output is prohibited, the password will not be uniquely identified, and thus even if a password that has been used once is leaked, it will be possible to prevent a subsequent unauthorized use, thus improving the security of the password.

Although in the above embodiment, a serviceman will input the password into the password acceptance unit after he or she is informed about the password by the administrator, it is possible to employ another system in which a serviceman will come to the image forming device 101 to obtain the current data, arrange the current data on the spot to refer to a predetermined sorted order similar to the order sorted by the password creating unit 110 in order to create the password, and input the password into the password acceptance unit.

Any terms of degree used herein, such as "substantially", "about" and "approximately", mean a reasonable amount of deviation of the modified term such that the end result is not significantly changed. These terms should be construed as including a deviation of at least ±5% of the modified term if this deviation would not negate the meaning of the word it modifies.

This application claims priority to Japanese Patent Application Nos. 2004-380426 and 2004-380427. The entire disclosure of Japanese Patent Application Nos. 2004-380426 and 2004-380427 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An image forming device, comprising:
an output control unit which prohibits output by the image forming device if specific image data is detected in image data of an original document that is read;
a current data acquisition unit which acquires current data corresponding to a time at which output is prohibited by the output control unit;
a password creating unit which creates a password in accordance with the current data acquired by the current data acquisition unit;
a transmit/receive unit which transmits image data which is prohibited from being output by the output control unit and receives output permission/prohibition data from an administrator;
an identification unit which identifies the output permission/prohibition data received by the transmit/receive unit;
an output permitted image generating unit which generates an output permitted image in which the password created by the password creating unit is embedded such that it is impossible for a user to identify the password, the output permitted image generating unit generating the output permitted image if the output permission data is identified by the identification unit;
an output unit which outputs the output permitted image generated by the output permitted image generating unit;
a reading unit which reads the output permitted image output by the output unit;
an extraction unit which extracts password data embedded in the output permitted image data which is read by the reading unit; and
a determination unit which determines whether or not the password extracted by the extraction unit and the password created by the password creating unit correspond to each other;
wherein the output control unit will lift a prohibition on output if the determination unit determines that the passwords correspond to each other.

2. An image forming device according to claim 1, wherein the output permitted image generating unit will generate the output permitted image such that the password created by the password creating unit will be embedded therein by means of a digital watermark, a two-dimensional code, or a bar code.

3. An image forming device according to claim 1, wherein the current data includes at least one selected from the group consisting of a number indicated by an output volume counter, and the time and date.

4. A storage medium for storing a control program that is executable by a computer in an image forming device, the control program causing the computer to execute functions comprising:
- an output control function which prohibits output by the image forming device if specific image data is detected in image data of an original document that is read;
- a current data acquisition function which acquires current data corresponding to a time at which output is prohibited by the output control function;
- a password creating function which creates a password in accordance with the current data acquired by the current data acquisition function;
- a transmit/receive function which transmits image data which is prohibited from being output by the output control function and receives output permission/prohibition data from an administrator;
- an identification function which identifies the output permission/prohibition data received by the transmit/receive function;
- an output permitted image generating function which generates an output permitted image in which the password created by the password creating function is embedded such that it is impossible for a user to identify the password, the output permitted image generating function generating the output permitted image if the output permission data is identified by the identification function;
- an output function which outputs the output permitted image generated by the output permitted image generating function;
- a reading function which reads the output permitted image output by the output function;
- an extraction function which extracts password data embedded in the output permitted image data which is read by the reading function; and
- a determination function which determines whether or not the password extracted by the extraction function and the password created by the password creating function correspond to each other;
- wherein the output control function will lift a prohibition on output if the determination function determines that the passwords correspond to each other.

* * * * *